United States Patent
Branson et al.

(10) Patent No.: US 9,489,695 B1
(45) Date of Patent: Nov. 8, 2016

(54) EXTENSIBLE INFRASTRUCTURE FOR MANAGING WORKFLOW ON A PLURALITY OF INSTALLED APPLICATION COMPONENTS THAT INTERACT WITH A CENTRAL HOSTED COMPONENT

(71) Applicant: Guidewire Software, Inc., Foster City, CA (US)

(72) Inventors: Kenneth William Branson, Los Altos, CA (US); Mui Thu Tran, San Carlos, CA (US); Raymond Timothy Kreisel, Palo Alto, CA (US)

(73) Assignee: Guidewire Software, Inc., Foster City, CA (US)

( * ) Notice: Subject to any disclaimer, the term of this patent is extended or adjusted under 35 U.S.C. 154(b) by 261 days.

(21) Appl. No.: 13/835,198

(22) Filed: Mar. 15, 2013

Related U.S. Application Data

(60) Provisional application No. 61/732,726, filed on Dec. 3, 2012.

(51) Int. Cl.
*G06Q 40/08* (2012.01)
*G06Q 10/10* (2012.01)
*G06Q 10/06* (2012.01)

(52) U.S. Cl.
CPC .......... *G06Q 40/08* (2013.01); *G06Q 10/0633* (2013.01); *G06Q 10/0635* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 2001/0047326 A1* | 11/2001 | Broadbent | ............. | G06Q 10/10 705/38 |
| 2002/0087364 A1* | 7/2002 | Lerner et al. | ...................... | 705/4 |
| 2002/0198743 A1* | 12/2002 | Ariathurai | ............. | G06Q 40/08 705/4 |
| 2005/0033761 A1* | 2/2005 | Guttman | ................ | G06N 5/022 |
| 2005/0075911 A1* | 4/2005 | Craven | ................ | G06Q 40/08 705/4 |
| 2006/0100912 A1* | 5/2006 | Kumar | ............. | G06F 17/30864 705/4 |
| 2008/0052101 A1* | 2/2008 | Ziade et al. | ...................... | 705/1 |
| 2008/0055096 A1* | 3/2008 | Aylward | ................ | G06Q 40/08 340/601 |
| 2009/0248452 A1* | 10/2009 | Hamilton et al. | ................ | 705/4 |
| 2011/0125651 A1* | 5/2011 | Reynolds et al. | ............. | 705/64 |

(Continued)

OTHER PUBLICATIONS

Programmers Stack Exchange, "When to Use workflow engines" (Jan. 20, 2012) [retrieved from http://programmers.stackexchange.com/questions/103972/when-to-use-workflow-engines].*

*Primary Examiner* — Brian W Wathen
(74) *Attorney, Agent, or Firm* — Van Pelt, Yi & James LLP

(57) ABSTRACT

Managing workflow on a plurality of installed application components that interact with a central hosted component is disclosed. A new rule is defined on the central hosted component. The new rule is applied, based on data provided by an installed application component and information that is managed by the central hosted component, to generate a new action item to be executed on the installed application component. The new action item to be executed by the installed application component is sent. The new action item modifies a workflow on the installed application component without modifying application code on the installed application component.

23 Claims, 8 Drawing Sheets

(56) References Cited

U.S. PATENT DOCUMENTS

| | | | |
|---|---|---|---|
| 2011/0137771 A1* | 6/2011 | Hamilton | 705/34 |
| 2011/0153368 A1* | 6/2011 | Pierre et al. | 705/4 |
| 2012/0296695 A1* | 11/2012 | McGill | G06Q 40/08 705/7.28 |
| 2013/0166326 A1* | 6/2013 | Lavie | G06Q 40/08 705/4 |
| 2013/0282407 A1* | 10/2013 | Snyder | G06Q 40/08 705/4 |
| 2014/0067428 A1* | 3/2014 | Snyder | G06Q 40/08 705/4 |
| 2014/0100888 A1* | 4/2014 | Wirz | G06Q 40/08 705/4 |
| 2014/0257862 A1* | 9/2014 | Billman | G06Q 50/163 705/4 |

* cited by examiner

EXTENSIBLE INFRASTRUCTURE FOR MANAGING WORKFLOW ON A PLURALITY OF INSTALLED APPLICATION COMPONENTS THAT INTERACT WITH A CENTRAL HOSTED COMPONENT

CROSS REFERENCE TO OTHER APPLICATIONS

This application claims priority to U.S. Provisional Patent Application No. 61/732,726 entitled AN EXTENSIBLE INFRASTRUCTURE FOR MANAGING WORKFLOW ON A PLURALITY OF INSTALLED APPLICATION COMPONENTS THAT INTERACT WITH A CENTRAL HOSTED COMPONENT filed Dec. 3, 2012 which is incorporated herein by reference for all purposes.

BACKGROUND OF THE INVENTION

For customers having applications installed at their sites, modifying the installed applications in order to extend functionality or integrate new features or services can be difficult and resource intensive. For example, the installed applications may be configured to a respective customer's requirements, resulting in the need for custom modifications to the installed applications as well as extensive testing, which can be burdensome and time consuming. This could, for example, lead to re-installation of applications and downtime of systems using the installed applications, impacting system users. This is further compounded if there are installed applications at a large number of customer sites.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
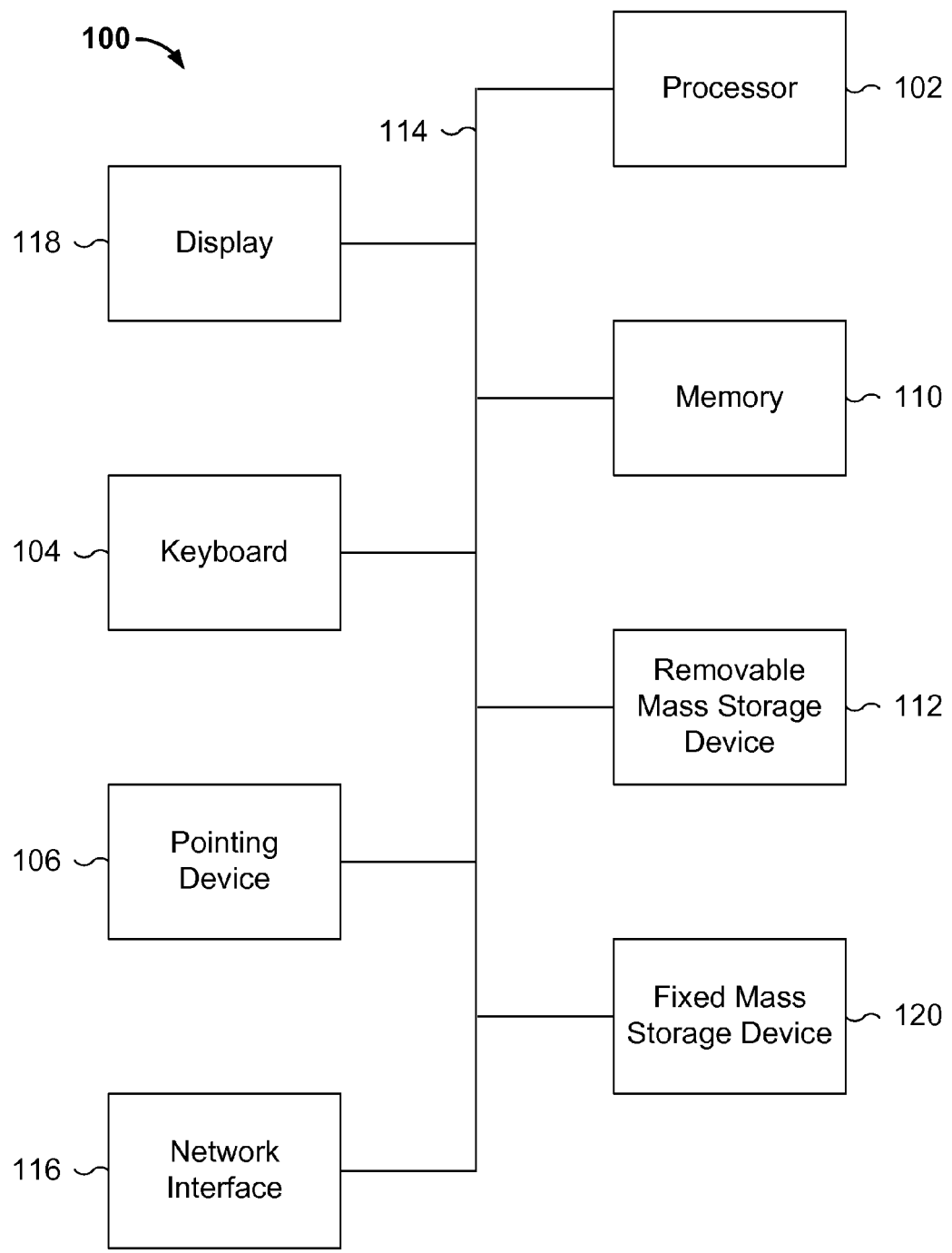
FIG. 1A is a functional diagram illustrating an embodiment of a programmed computer system for managing workflows on a plurality of installed application components that interact with a central hosted component.

FIG. 1A is a functional diagram illustrating an embodiment of a programmed computer system for managing workflows on a plurality of installed application components that interact with a central hosted component. As will be apparent, other computer system architectures and configurations can be used to display insurance policy rating. As will be apparent, other computer system architectures and configurations can be used to generate insurance quotes. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to manage workflows on a plurality of installed application components that interact with a central hosted component.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 1B:
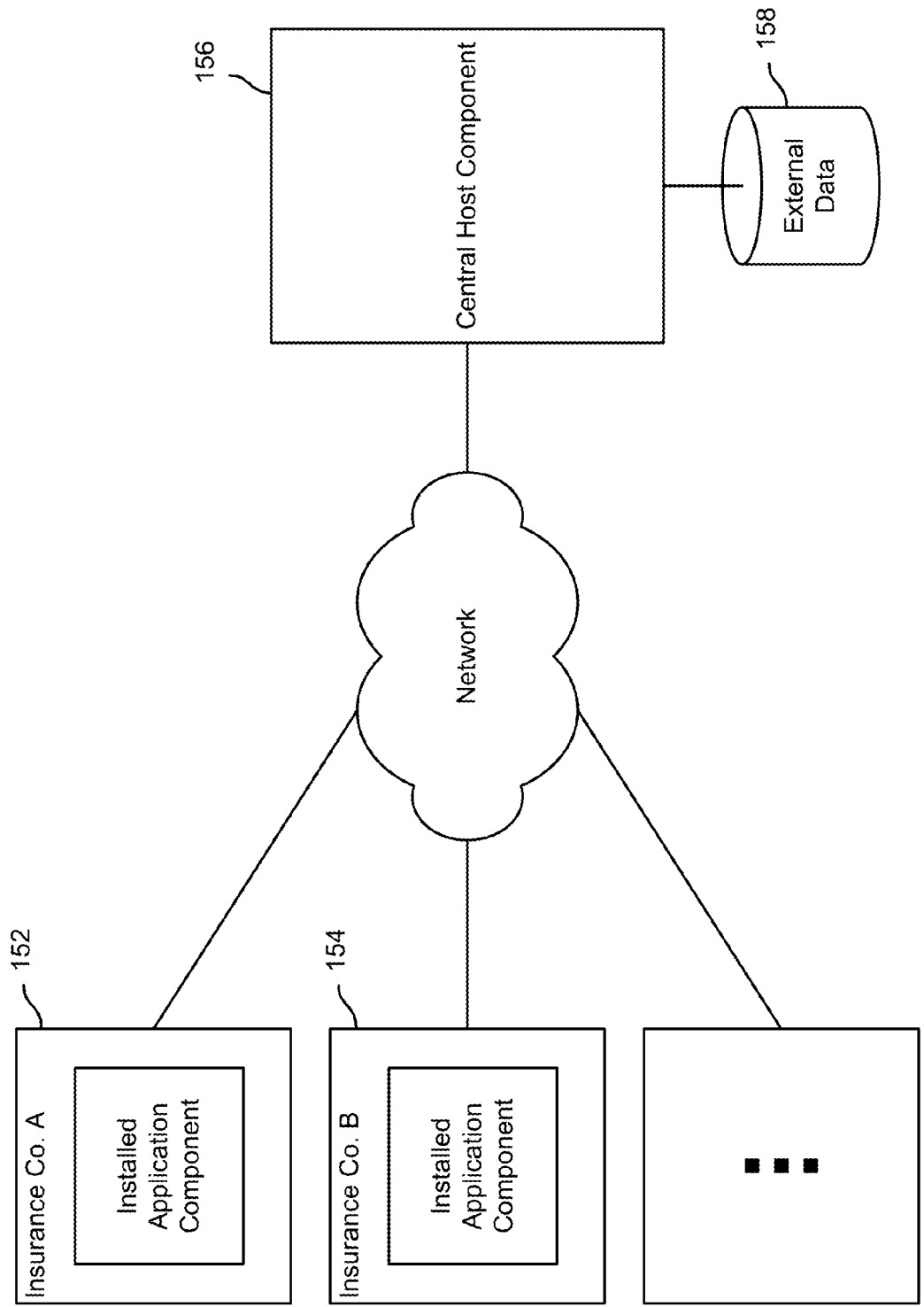
FIG. 1B is a block diagram illustrating an embodiment of an extensible infrastructure for managing workflows on a plurality of installed application components that interact with a central hosted component.

FIG. 1B is a block diagram illustrating an embodiment of an extensible infrastructure for managing workflows on a plurality of installed application components that interact with a central hosted component. In the example shown, a service provider such as Guidewire™ installs and manages a set of insurance processing related software application components at various customer sites, such as customer sites 152 and 154. In various embodiments, the installed applications run on one more devices such as servers or any other appropriate device. In various embodiments, the insurance related software applications include applications for policy underwriting, claim management, billing, etc. Customers of the service provider include insurance companies (e.g., A and B). Any number of customers may have installed, at their sites, applications provided by the service provider.

In the example shown, the service provider operates a central hosted component (156) such as Guidewire™ Live, which interacts with the application components installed at the various customer sites via a network such as the Internet or a proprietary network. In some embodiments, the installed application components and the central hosted component are not collocated. In some embodiments, the central hosted component comprises a server or any other appropriate centrally hosted component.

In some embodiments, the central hosted component is configured to manage or affect the behavior of insurance processing related workflows (which operate on/are relative to insurance entities such as claims, policies, etc.) on the installed application components by using information obtained from the installed application components as well as information managed by the central hosted component, which can include information obtained from external sources (158).

For example, while underwriting a policy and processing a quote using an installed application component, an insurance agent can send the address of the policy being quoted to the central hosted component, which can use weather information to determine whether the home at the address is in the track of a storm. Based on this information, the central hosted component can provide an alert or a hold on a policy underwriting workflow, preventing the new policy from being written.

By using an extensible infrastructure connecting the installed application components and the central hosted component, the central hosted component can augment information available to the installed application, extend functionality of the installed application, or alter behavior of the installed application component at the customer site using information managed by the central hosted component without modifying application code on the installed application component.

Figure 2:
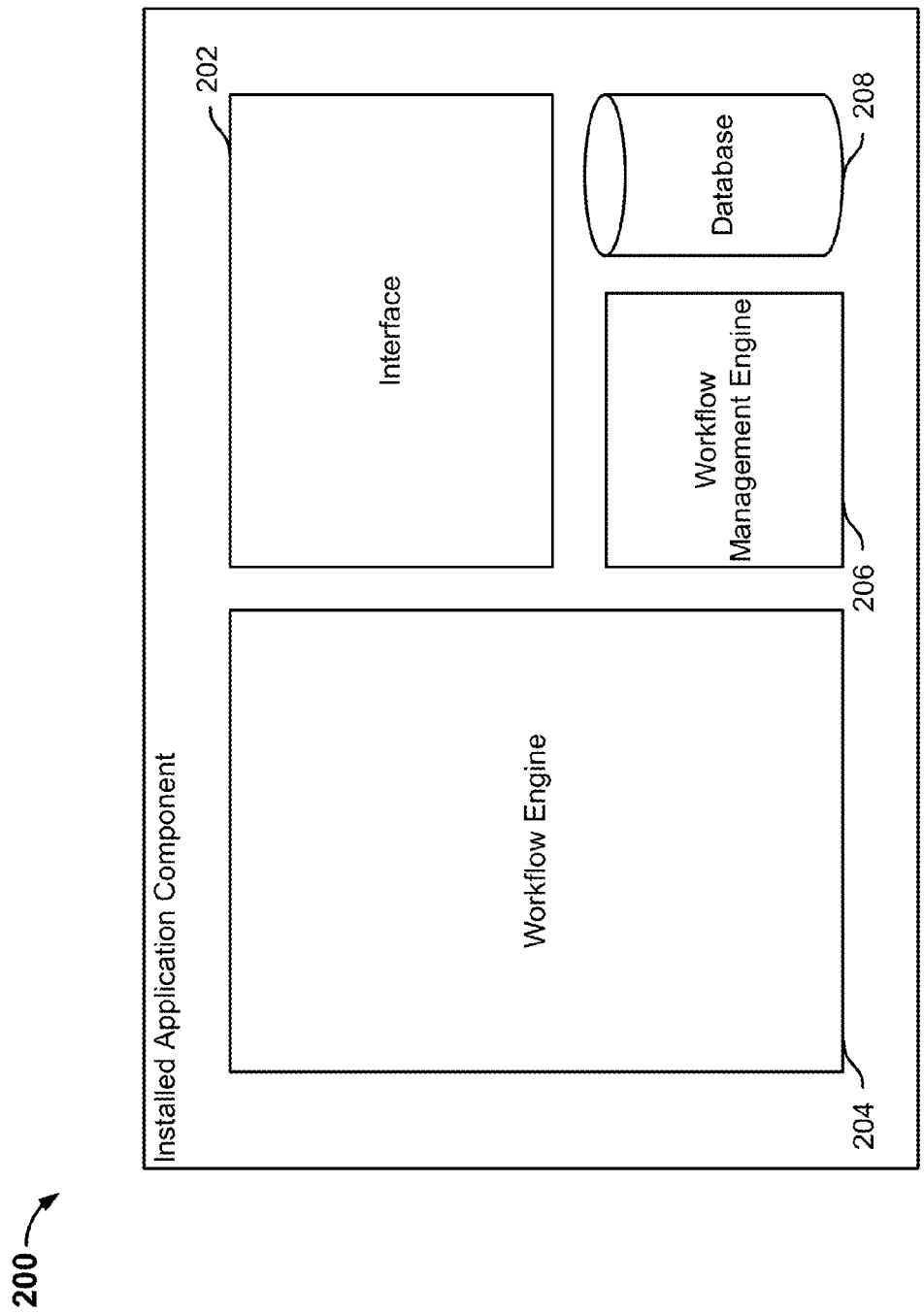
FIG. 2 is a block diagram illustrating an embodiment of an installed application component.

FIG. 2 is a block diagram illustrating an embodiment of an installed application component. In some embodiments, installed application component 200 is an example of application components installed at customer sites 152 and 154 of FIG. 1B. In the example shown, installed application component 200 includes interface 202, workflow engine 204, workflow management engine 206, and database 208.

In some embodiments, interface 202 is configured to communicate or connect with a central hosted component, such as central hosted component 156 of FIG. 1B. In some embodiments, interface 202 is configured to transmit insurance related data (e.g., claim data, policy data, billing data, etc.) to a central hosted component. The insurance related data may be stored in data storage 208.

Interface 202 is configured to receive information associated with insurance related processing that can be used to manage/modify an insurance process workflow. In some embodiments, the received information includes action items received from the central hosted component that are to be executed by the installed application component (e.g., via workflow management engine 206, which will be described in more detail below). In some embodiments, action items include workflow management mechanisms (e.g., underwriting issues, notifications, alerts, activities, trouble tickets, holds, etc., which will be described in more detail below) or any other appropriate action item which may be used to modify/manage/alter the behavior of an insurance process workflow. In some embodiments, executing an action item involves generating an underwriting issue, a claim alert, a billing hold, a trouble ticket, or any other appropriate workflow management mechanism. In some embodiments, the action items are stored/archived in persistent data storage, such as database 208.

In some embodiments, interface 202 operates in either a synchronous or an asynchronous mode. For example, in an offline asynchronous mode, the installed application can send insurance related data to the central hosted component periodically (e.g., as part of a nightly feed) and receive action items at a later time (e.g., periodically or at another predetermined time). As another example, in asynchronous mode, the installed application component can communicate with the central hosted component to request information/action items from the central hosted component at one stage of a process workflow, and at a later stage, detect whether a response from the central hosted component has been received. For example, the installed application component can check/query database 208, read a message queue, etc. at a later stage in the workflow to determine whether a response has been received from the central hosted component.

In some embodiments, rather than receiving responses (e.g., action items) from the central hosted components and querying/reading databases, message queues, etc. on the installed application component, the installed application component can call the central hosted component to determine whether a response to a previous query/request is available. For example, at one stage of a process workflow, the installed application component may request from the central hosted component historical information of a vehicle to determine whether it has previously been damaged in an accident. Satisfying the request could potentially take several hours, and thus a response cannot be presented immediately to the request. At a later time, the installed application component can "check-in" and make a call to the central hosted component to determine whether the central hosted component has available a response to the previous request. In various embodiments, the installed application component calls the central hosted component periodically, at a predetermined time subsequent to the request, at a stage/time of the process workflow in which the response to the request is required, etc. In some embodiments, the central hosted component publishes a response that the installed application component retrieves.

In synchronous mode, the installed application can transmit insurance data as well as receive responses on-demand to/from the central hosted component while insurance related processing is occurring. For example, while a new weather related loss is being claimed, a connection can be established with the central hosted component to request weather information, which can be used to alter/change the behavior of the workflow. As described above, action items can also be received and applied (e.g., apply received alerts, holds, or underwriting issues, add activities to the workflow, evaluate the action items to modify behavior/steps of the process workflow, etc.).

In some embodiments, the connection between the installed application component and the central hosted component is established by the installed application component. For example, the installed application may have a timer that periodically calls the central host component so that the central component can respond. This may be done for security purposes, for example, so that the firewall at the customer site does not need to be opened.

In some embodiments, workflow engine 204 is configured to perform workflows (which can include multiple processing steps) associated with insurance related processing, such as claim management (e.g., settling a claim), policy underwriting, policy quoting, billing, resolving a billing question, etc.

In some embodiments, workflow management engine 206 is configured to manage an insurance related workflow, such as that performed by workflow engine 204. In some embodiments, workflow management engine 206 is configured to evaluate information and/or action items received from a central hosted component to manage/modify the behavior or an insurance related workflow. In some embodiments, the workflow management engine includes various features and mechanisms for managing an insurance related process or workflow, such as notifications, activities, underwriting issues, trouble tickets, holds, or any other appropriate mechanism. The workflow management engine and its various features and mechanisms can also be leveraged by a central hosted component (e.g., via action items received from the central hosted component) to manage/modify the workflows on an installed application component.

As described above, in various embodiments, workflow management mechanisms include underwriting issues, notifications, alerts, activities, trouble tickets, holds, etc. In some embodiments, notifications include claim alerts, which can appear visually as a flag or warning on a claim that is being processed. For example, if fraud has been detected with the claim, a fraud detection notification claim alert can be displayed for the claim.

In some embodiments, activities comprise work/to-do items or tasks associated with a workflow that are tracked by an insurance application. In various embodiments, activities include a date, priority, subject, and any appropriate additional information associated with an activity. For example, an activity can be created for a claim, which can appear in an adjustor's inbox (e.g., as an email message). If the due date for the activity is approaching or overdue, the supervisor for the adjustor can, for example, receive a warning about the activity.

In some embodiments, an underwriting issue is used to affect an insurance underwriting related workflow. In some embodiments, an underwriting issue is a block that appears in the process of underwriting a policy.

In some embodiments, trouble tickets and holds are associated with billing workflow processes. In some embodiments, a trouble ticket is opened by a customer and comprises an act that is to always be done with respect to a particular invoice item. In some embodiments, a hold comprises a hold on workflow proceedings. For example, in the event that a storm has affected an area, delinquency proceedings for policies can be placed on hold such that affected people do not have their policy cancelled because they are unable to pay for their policy due to mail service being interrupted in the area because of the storm.

In some embodiments, workflow management engine 206 is configured to manage insurance processing related workflows by evaluating action items received from a central hosted component. For example, in some embodiments, the received action items are analyzed/evaluated against a set of rules, in order to generate custom actions, satisfy special handling policies, etc. that may affect the behavior of a workflow.

In some embodiments, workflow management engine 206 is configured to operate and manage insurance processing workflows in an asynchronous mode. For example, in an asynchronous mode, a workflow on the installed application component can make requests for additional information/action items from the central hosted component. At a later stage in the workflow, responses to the request can be detected/checked for (e.g., by querying data storage such as database 208, reading a queue, calling the central hosted component, etc.). If a response has been received from or otherwise made available by the central hosted component, the communicated information/action items can be evaluated against a set of rules to determine the subsequent steps in the workflow. If a response has not yet been made available by the central hosted component, the workflow management engine 206 can stall or pause the workflow and wait for a response from the central hosted component before continuing the workflow.

In some embodiments, workflow management engine 206 is configured to operate and manage insurance processing workflows in a synchronous mode, in which requests for information from the central hosted component are made in an on-demand manner or as-needed basis.

As described above, existing workflow management features/mechanisms can be leveraged and/or information/action items received from a central hosted component can be evaluated such that a workflow can be managed or have its behavior altered by a central hosted component without modifying application code on the installed application component.

Figure 3:
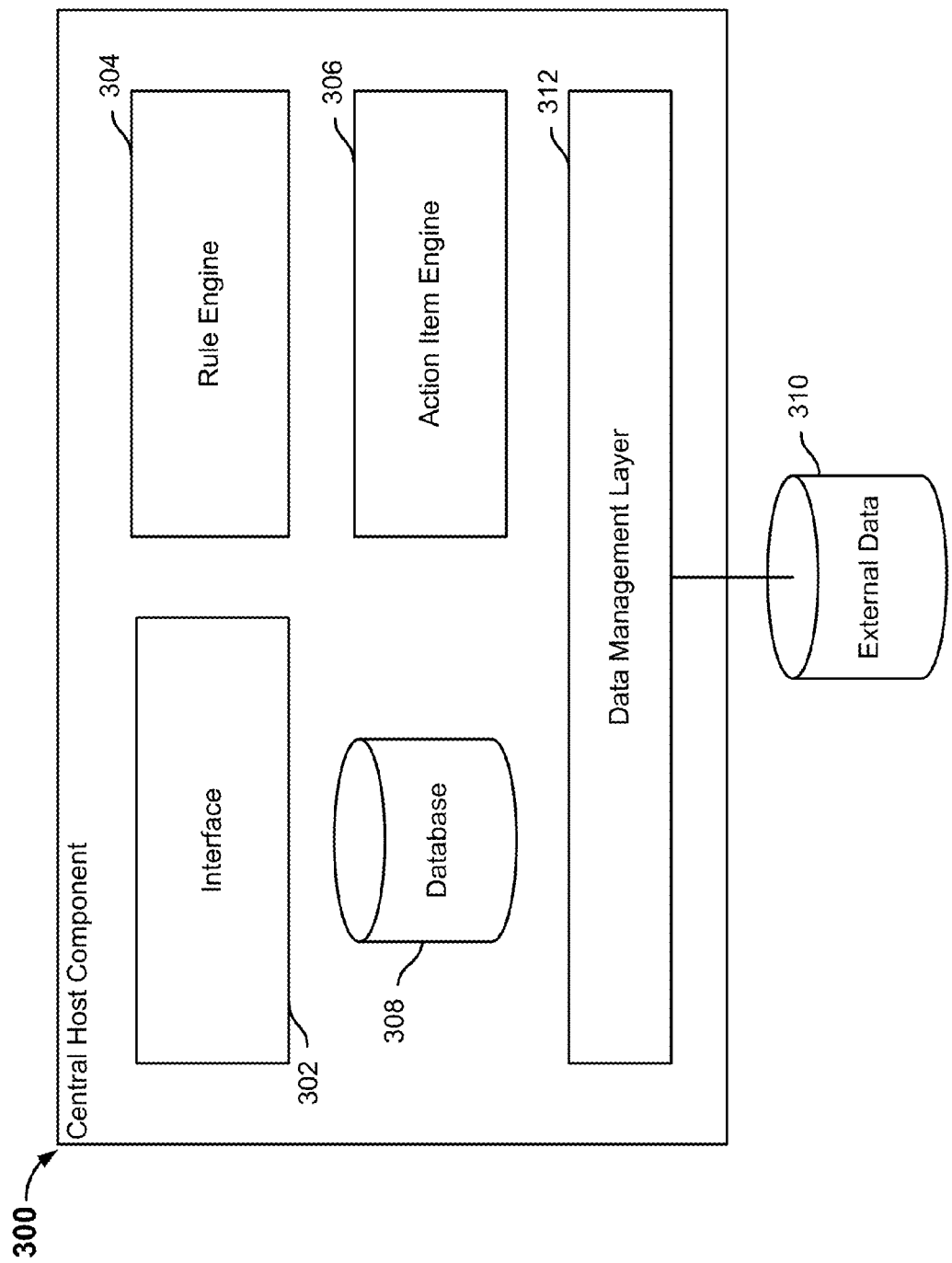
FIG. 3 is a block diagram illustrating an embodiment of a central hosted component.

FIG. 3 is a block diagram illustrating an embodiment of a central hosted component. In some embodiments, central hosted component 300 is an example of central hosted component 156 of FIG. 1B. In the example shown, central hosted component 300 includes interface 302, rule engine 304, action item engine 306, and database 308. In some embodiments, central host component 300 manages information such as information associated with external data 310 via data management layer 312.

Interface 302 is configured to communicate with installed application components, such as those at customer sites 152 and 154 of FIG. 1B. In some embodiments, interface 302 is configured to receive insurance related data (e.g., claim data, policy data, billing data, etc.) from installed application components. In some embodiments, interface 302 is also configured to receive external data (310), which is managed by the central hosted component via data management layer 312, and which will be described in more detail below. In some embodiments, interface 302 is also configured to transmit generated action items to the installed application component.

In some embodiments, interface 302 operates in either a synchronous or an asynchronous manner. For example, in the asynchronous scenario, interface 302 can receive a nightly feed of insurance data from the installed application interface. The insurance related data can also be received periodically or at any other appropriate predetermined time.

Action items can also be transmitted to the installed application components in an asynchronous manner. For example, generated action items can be queued or stored in a data storage unit such as database 308, a buffer, or any other appropriate data storage. The queued action items can then be transmitted to the installed application components the next time that a connection is established by the installed application component (e.g., periodically, or at a predetermined later time).

In some embodiments, in synchronous mode, connections between the installed application components and the central hosted component are established on-demand and insurance data and action items are communicated dynamically (e.g., in real-time) in response to on-demand requests for information from the installed application component (e.g., request by installed application component for information from central host while claim is being processed at installed application component).

In some embodiments, rule engine 304 is configured to define rules for creating/generating an action item. The rules can be defined either by a service provider such as Guidewire™ or a customer (e.g., via a web interface). In some embodiments, the rules define, for a given condition, the type and/or content of the action item to be generated. In some embodiments, the defined rules are included in a rule set and are stored on the central hosted component (e.g., in database 308). The rules can be used to check for anomalous conditions (e.g., using insurance related data received from installed insurance applications as well as information managed by the central hosted component) to determine an appropriate action item to generate.

In some embodiments, action item engine 306 is configured to apply rules and generate action items. In some embodiments, information received from installed application components and data managed by the central hosted component is applied to rules (e.g., defined using rule engine 304) that may be included in a rule set. For example, the received information can be evaluated/applied against each of the rules in a rule set to determine which rules apply to the conditions associated with the received information. Based on the identified rules, appropriate action items are generated which can then be sent to the installed application component to modify/manage the behavior of an insurance related process workflow. As described above, action items include insurance processing related actions, such as notifications, activities, underwriting issues, alerts, trouble tickets, holds, blocks, or any other appropriate insurance processing related action.

In some embodiments, data management layer 312 is configured to manage information. In some embodiments, the information managed by the central hosted component using the data management layer includes information received from various sources, such as third party services/sources as well as from installed application components (e.g., information from customers of a service provider such as Guidewire™). The information can then be integrated into the central hosted component for use in augmenting information available to the installed application, extending functionality of the installed application, altering behavior of the installed application component at a customer site without modifying application code on the installed application component, etc. As integration of the data and extended functionality is performed and managed at the central hosted component, the integration does not have to be performed at each of the installed application components. Additionally, future integration of data from third party sources and extended functionality can be performed once at the central hosted component, rather than at the installed application components.

Figure 4:
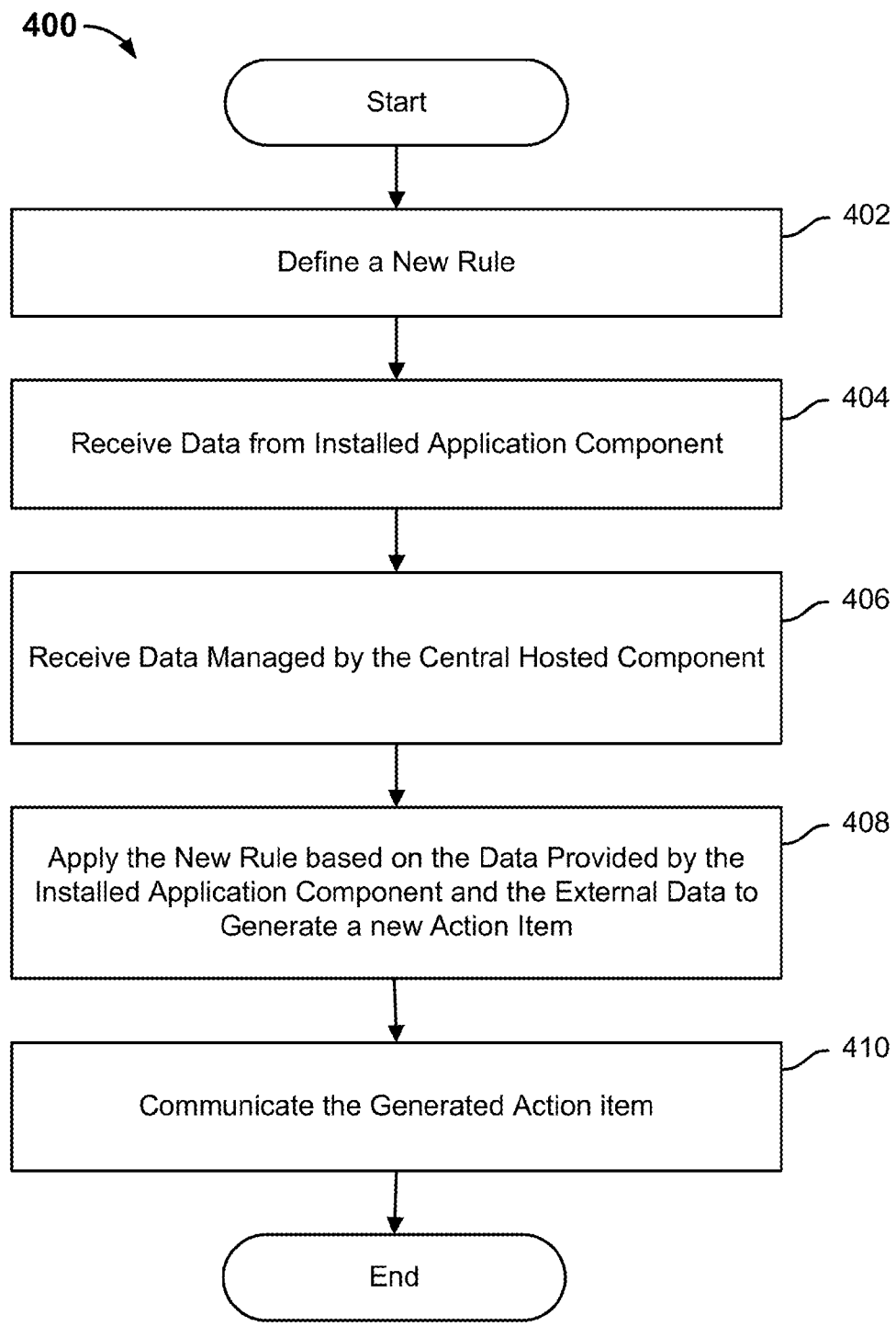
FIG. 4 is a flow diagram illustrating an embodiment of a process for managing workflow on a plurality of installed application components that interact with a central hosted component.

FIG. 4 is a flow diagram illustrating an embodiment of a process for managing workflow on a plurality of installed application components that interact with a central hosted component. In some embodiments, process 400 of FIG. 4 is executed by rule engine 304 and action item engine 306 of central host component 300. The process begins at 402 when a new rule is defined. As described above, the defined rules can determine action items to generate based on various conditions, and can be defined by either a service provider such as Guidewire™ or a customer of the service provider (e.g., insurance companies). In some embodiments, the newly defined rule is stored on the central hosted component.

At 404, insurance related data is received from an installed application component. As described above, the insurance related data can include policy data, claim data, billing data, or any other appropriate insurance related data. In some embodiments, the insurance related data is associated with an insurance entity (e.g., claim, policy, etc.) that the workflow is to operate on. At 406, data/information managed by the central hosted component is received.

In various embodiments, the information managed by the central hosted component includes geographical data, weather data, traffic data, street view information, satellite information, or any other appropriate data. The information can be provided by various third party sources/services and integrated into the central hosted component (e.g., using APIs to the third party services). In some embodiments, the information managed by the central hosted component includes information/services (such as those described above) that are unavailable to the installed application components.

In some embodiments, the information managed by the central hosted component includes aggregated information from customers of a service provider such as Guidewire™. The aggregated information can include statistics (e.g., aggregated insurance statistics) calculated/computed from information received from various customers (e.g., insurance carriers). For example, the central hosted component can receive data from the installed application components (e.g., associated with various insurance carriers), anonymize the data, and compute/derive aggregate statistics/metrics from the received/pooled data. As the aggregated data is hosted centrally, sensitive customer information can be protected such that one customer cannot directly view the data of another customer.

The pooled information can then be used to modify a processing workflow. For example, when underwriting a policy, a request can be sent to the central hosted component to evaluate claim data aggregated across multiple customers to determine claim behavior (e.g., in a particular neighborhood, for a particular type of vehicle, type of dwelling, etc.), and in the event that an issue arises (e.g., based on rules), a workflow modification mechanism/new action item (e.g., underwriting issue) can be generated to interrupt the policy underwriting workflow. At 408, the new rule is applied based on the received information provided by the installed application component and the information managed by the central hosted component to generate an action item. In some embodiments, the received information is used to identify conditions that satisfy one or more rules included in a rule set. The selected rules are then applied to generate a new action item to be executed on the installed application component.

At 410, the new action item is communicated. In various embodiments, communicating the new action item includes sending the new action item to the installed application component (e.g., storing it in a database or message queue), publishing the new action item for the installed application component to retrieve, etc. The new action item can be used to modify a workflow (which operates with respect to a particular insurance entity such as a claim, policy, account, etc.) on the installed application component without modifying application code on the installed application component.

In some embodiments, the workflow to be modified is determined based on characteristics of the insurance entity with which it is related. For example, if the insurance entity of interest is of the policy claim type, then a claim management workflow can be determined for modification. Other workflows (e.g., policy underwriting, policy quoting, billing, resolving a billing question, etc.) to be modified can be determined based on the insurance entity of interest.

Example Scenario: Weather Catastrophe

Figure 5:
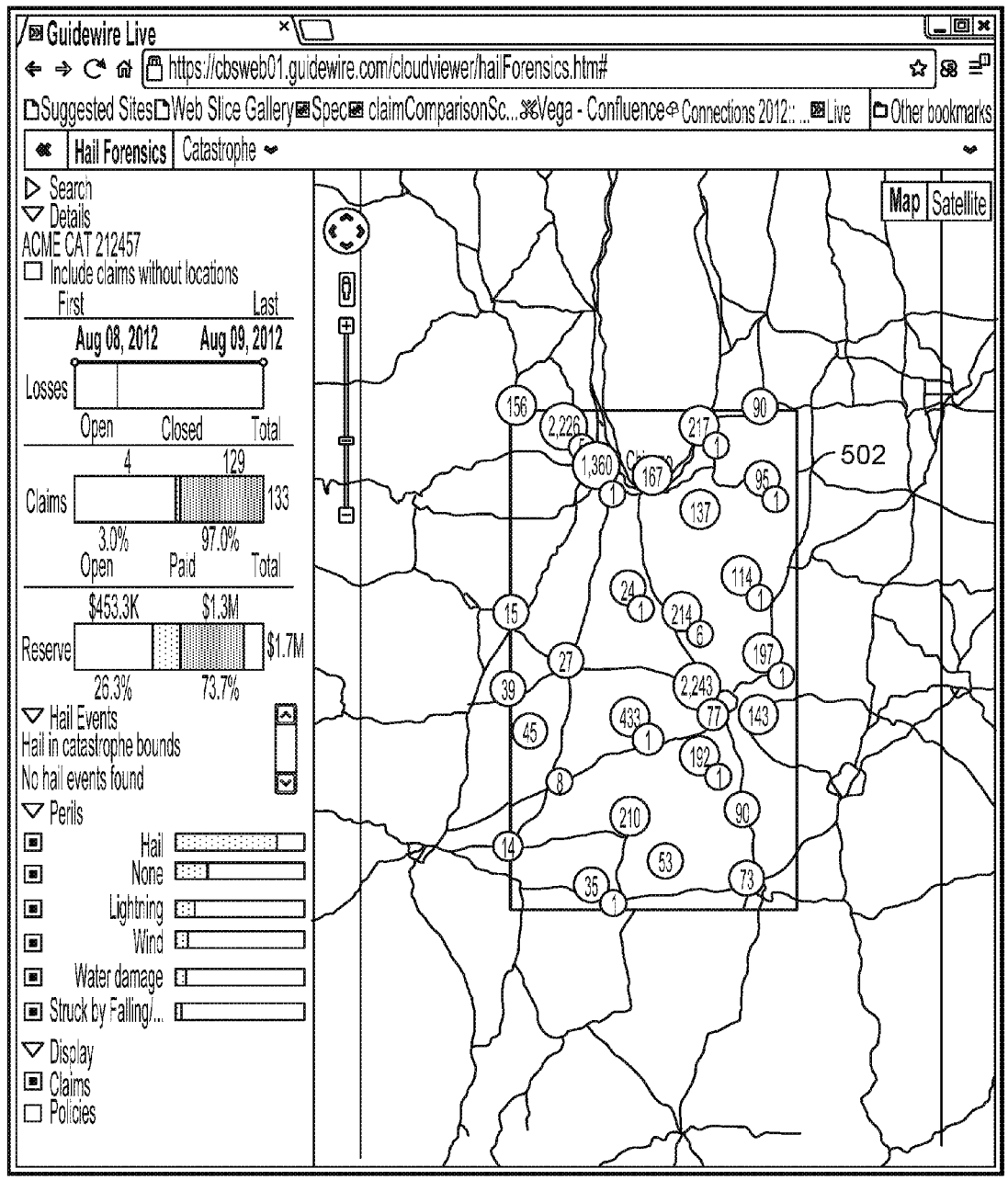
FIG. 5 is a diagram illustrating an example interface showing a selected catastrophe and an associated bounding rectangle on a map.

FIG. 5 is a diagram illustrating an example interface showing a selected catastrophe and an associated bounding rectangle on a map. In this example, a customer (e.g., insurance agent or adjustor of a carrier) is involved with a workflow of processing claims associated with a recent weather catastrophe. In some embodiments, the customer at an installed application component defines a region to evaluate, such as the geographical region indicated by bounding rectangle 502 on the map. In some embodiments, the bounds of the geographical region to be evaluated are defined via user input. For example, the user can draw bounds (e.g., via a mouse or touch input), select from pre-defined bounds/regions, such as city, state, zip, country, etc. (e.g., via a drop-down menu, radio buttons, etc.), or use any appropriate user input for defining a geographical region to evaluate. In some embodiments, custom bounds of arbitrary shapes and dimensions can be defined.

Affected insurance entities (e.g., claims, policies, accounts, etc.) of interest that are encompassed within the defined region can then be determined/identified for evaluation. Additionally, workflows to be modified can be identified based on characteristics of the identified insurance entities. The affected claims and policies can be identified by searching information available to the installed application component as well as information managed by the central hosted component. The insurance customer can then use insurance related data from the installed application component as well as information requested from/provided by a central hosted component such as Guidewire™ Live to further explore details of identified claims in the selected region. For example, in order to verify the causes of loss for the claims included within the defined bounds, the insurance adjustor can request weather and street view information that is managed by the central hosted component such as Guidewire™ Live.

Figure 6:
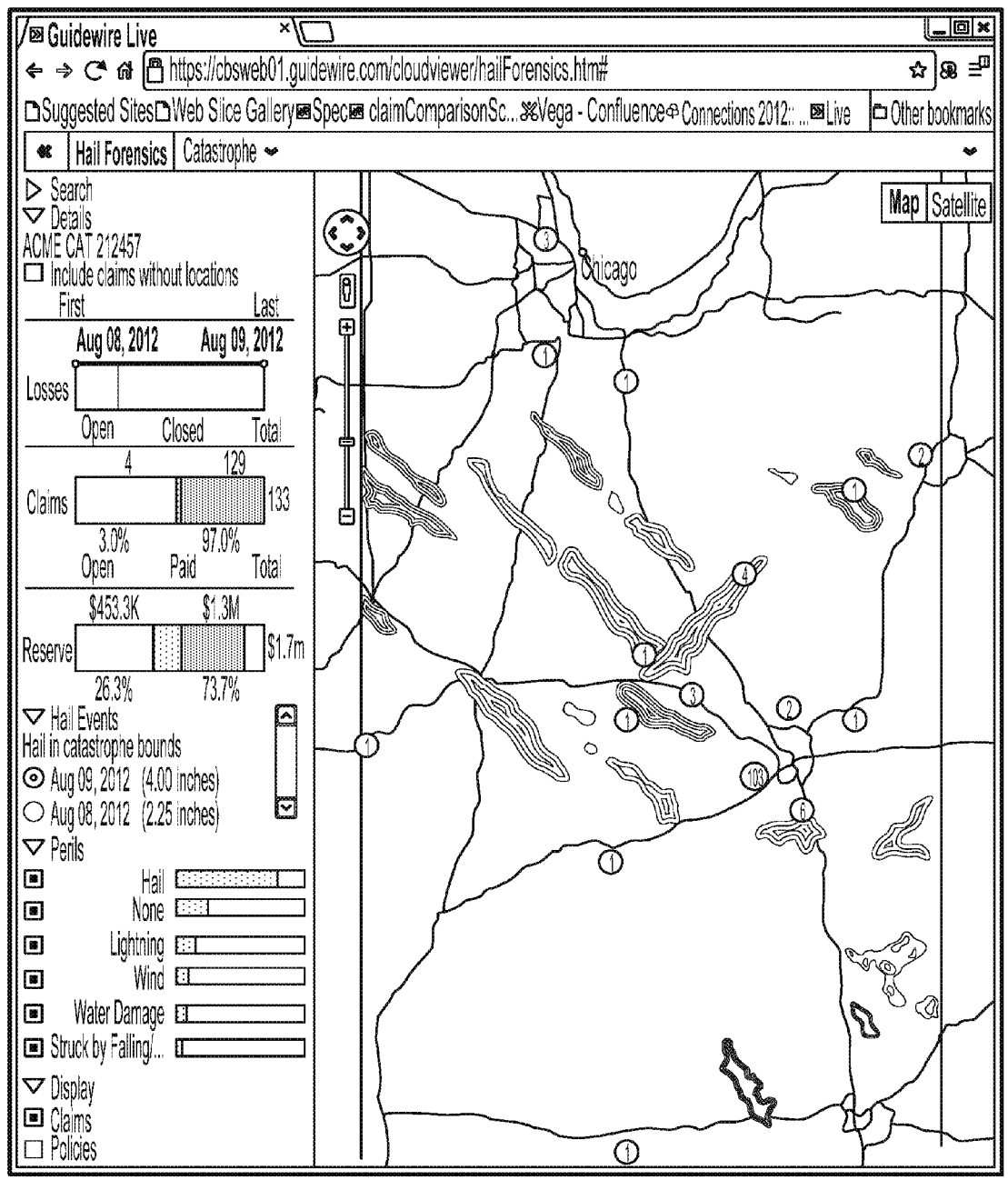
FIG. 6 is a diagram illustrating an example interface showing a selected hail event associated with the catastrophe.

FIG. 6 is a diagram illustrating an example interface showing a selected hail event associated with the catastrophe. In the example shown, the requested weather information associated with the claims included within bounds 502 of FIG. 5 is used to generate contours on the map that indicate measured hail stone sizes. The map can also be augmented with other weather event information (e.g., lighting, wind, water, etc.), as well as insurance related information (e.g., policy/claim information).

Figure 7:
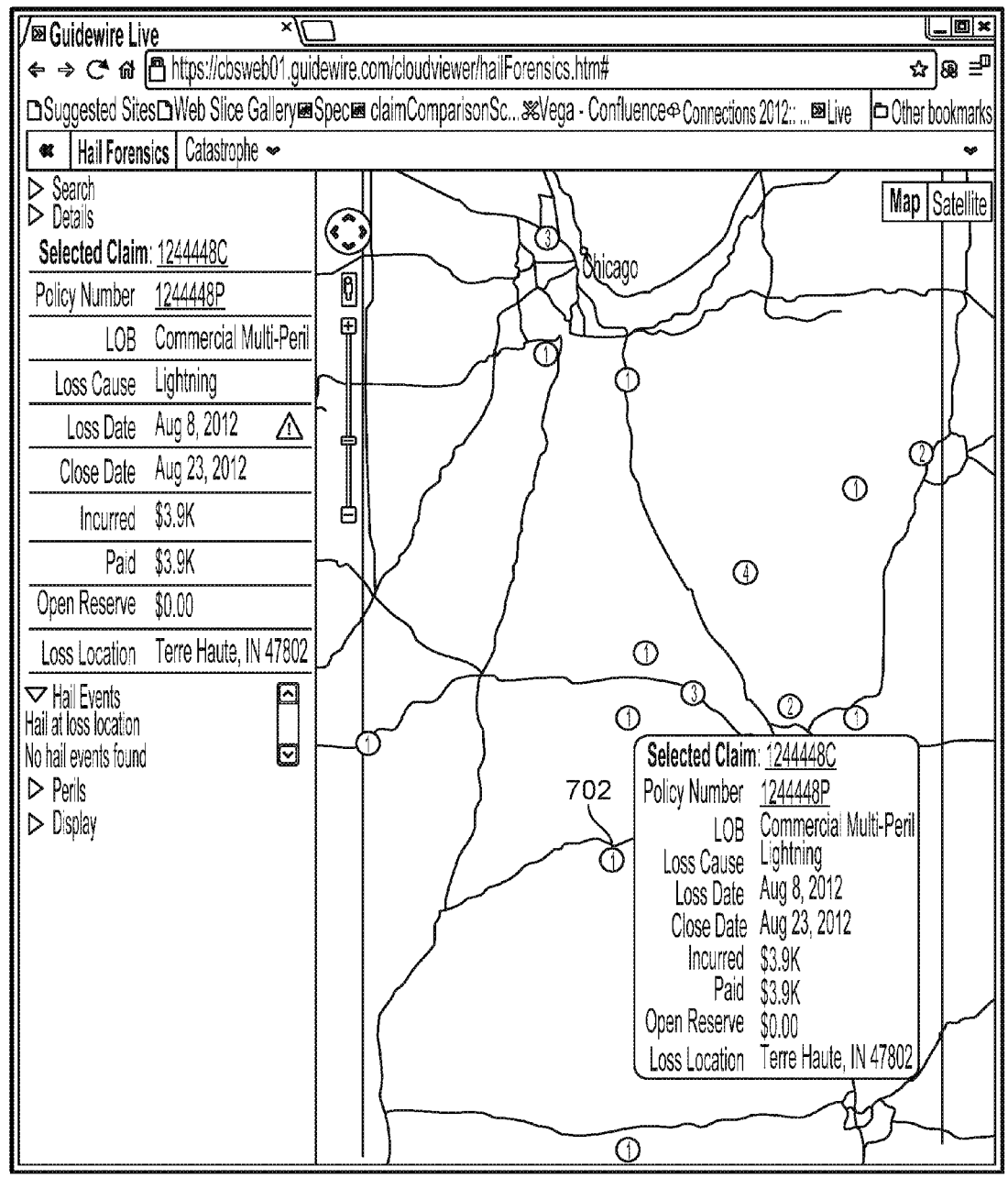
FIG. 7 is a diagram illustrating an example interface showing details of a selected claim.

FIG. 7 is a diagram illustrating an example interface showing details of a selected/identified claim. In some embodiments, a customer is able to select a claim from a map in order to explore further details of a particular claim. In the example shown, claim 702 on the map has been selected. In response to the selection, information associated with the particular claim can be displayed. For example, policy/claim information stored on the installed application component, such as policy number, line of business, loss cause, loss date, close date, incurred cost, paid amount, open reserve, loss location, or any other appropriate insurance related information can be displayed. The information can be obtained in an on-demand manner.

In some embodiments, information managed/provided by a central hosted component can also be displayed. For example, as described above, weather information can be displayed (e.g., in the form of contours overlaying map). As another example, if street view information is obtained, an insurance agent/adjustor can use the street view information to visually inspect a property at the location of a claim. For example, using weather and street view information requested from the central hosted component, the insurance agent/adjustor can, for a claim indicating a cause of loss of lighting, use the weather map information to determine whether there was any lightning in the proximity of the property indicated in the claim. The insurance adjustor can then also, using the street view information, determine characteristics of the property, such as the material that the roof on the property is composed of, the number of trees in the vicinity of the home, etc. Real-time information could also be used to determine whether damage to the house is consistent with lightning damage, as well as the severity of the damage.

Additionally, using the insurance related information received from the installed application component in conjunction with information managed by the central hosted component, the central hosted component can determine, by applying a rule, whether an action item should be generated to modify processing workflows related to an identified insurance entity of interest. For example, in the lightning example, if the address of the home for a claim being processed was not in an area affected by lightning, but the indicated cause of loss was due to lightning, a rule associated with the scenario that checks whether a weather-related indicated cause of loss matches weather information (that the central hosted component manages) can be selected and applied. An action item can then be generated that when executed by the installed application component, will put a hold on processing of a workflow associated with the claim and alert an insurance agent/adjustor of a possible fraudulent claim. As described above, the action item can be communicated from the central hosted component to the application component in a variety of ways, for example, by sending the action item to the installed application component to be stored at a database or placed in a message queue on the installed application component, published for the installed application component to retrieve, or returned in response to a query by the installed application component.

As shown in the example above, by interacting with a central hosted component that manages integration with weather and street view information, functionality of the installed application component could be augmented, and insurance related processing workflows on the installed application component could be modified. Through interaction of an installed application component with a central hosted component using an extensible infrastructure, an action item modifying the workflow on the installed application can be generated and executed without modifying application code on the installed application component.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
defining, on a central hosted component, a new rule for determining an action item that is usable to modify insurance related processing workflows on a plurality of remote, installed application components that interact with the central hosted component, wherein the plurality of remote, installed application components are associated with different insurance carriers;
obtaining, from a remote, installed application component included in the plurality of remote, installed application components, insurance related data associated with an insurance entity on which a workflow on the remote, installed application component is operating;
determining, based at least in part on the defined new rule and data aggregated from at least some of the other remote, installed application components included in the plurality of remote, installed application components that are associated with different insurance carriers, that a new action item to be executed on the remote, installed application component should be generated;
generating, at the central hosted component, the new action item based at least in part on the determination; and
communicating, to the remote, installed application component, the generated new action item to be executed by the remote, installed application component, wherein the new action item, when executed by the remote, installed application component, modifies the workflow on the remote, installed application component without modifying application code on the remote, installed application component.

2. The method of claim 1, further comprising storing the new rule on the central hosted component.

3. The method of claim 1, wherein the new action item includes one or more of an insurance related activity, underwriting issue, alert, notification, hold, trouble ticket, or block.

4. The method of claim 1, further comprising identifying the insurance entity that is associated with the workflow.

5. The method of claim 4, wherein identifying the insurance entity is based at least in part on geographical bounds.

6. The method of claim 4, further comprising identifying the workflow on the remote, installed application component to be modified using the generated new action item based at least in part on characteristics of the insurance entity.

7. The method of claim 4, wherein the insurance entity includes at least one of a claim, policy, or account.

8. The method of claim 1, further comprising obtaining data from an external third-party source that is unavailable to the remote, installed application component.

9. The method of claim 1, further comprising anonymizing at least a portion of the data received from the at least some of the other remote, installed application components included in the plurality of remote, installed application components that are associated with different insurance carriers.

10. The method of claim 1, wherein aggregating the data received from the at least some of the remote, installed application components includes deriving aggregate statistics from at least a portion of the data received from the at least some of the remote, installed application components.

11. The method of claim 1, wherein the insurance entity comprises a claim, wherein the defined new rule and the data aggregated from at least some of the other remote, installed application components are used to detect fraud associated with the claim, and wherein the new action item to be executed on the remote, installed application component comprises a fraud detection notification alert.

12. A system, comprising:
a set of one or more processors configured to:
define, on a central hosted component, a new rule for determining an action item that is usable to modify insurance related processing workflows on a plurality of remote, installed application components that interact with the central hosted component, wherein the plurality of remote, installed application components are associated with different insurance carriers;
obtain, from a remote, installed application component included in the plurality of remote, installed application components, insurance related data associated with an insurance entity on which a workflow on the remote, installed application component is operating;
determine, based at least in part on the defined new rule and data aggregated from at least some of the other remote, installed application components included in the plurality of remote, installed application components that are associated with different insurance carriers, that a new action item to be executed on the remote, installed application component should be generated;
generate, at the central hosted component, the new action item based at least in part on the determination; and
communicate, to the remote, installed application component, the generated new action item to be executed by the remote, installed application component, wherein the new action item, when executed by the remote, installed application component modifies the workflow on the remote, installed application component without modifying application code on the remote, installed application component; and
a memory coupled to the set of one or more processors and configured to provide the set of one or more processors with instructions.

13. The system recited in claim 12, wherein the set of one or more processors is further configured to store the new rule on the central hosted component.

14. The system recited in claim 12, wherein the new action item includes or more of an insurance related activity, underwriting issue, alert, notification, hold, trouble ticket, or block.

15. The system of claim 12, wherein the set of one or more processors is further configured to identify the insurance entity that is associated with the workflow.

16. The system of claim 15, wherein identifying the insurance entity is based at least in part on geographical bounds.

17. The system of claim 15, wherein the set of one or more processors is further configured to identify the workflow on the remote, installed application component to be modified using the generated new action item based at least in part on characteristics of the insurance entity.

18. The system of claim 15, wherein the insurance entity includes at least one of a claim, policy, or account.

19. The system of claim 12, wherein the set of one or more processors is further configured to obtain data from an external third-party source that is unavailable to the remote, installed application component.

20. A computer program product embodied in a non-transitory computer readable storage medium and comprising computer instructions for:
defining, on a central hosted component, a new rule for determining an action item that is usable to modify insurance related processing workflows on a plurality of remote, installed application components that interact with the central hosted component, wherein the plurality of remote, installed application components are associated with different insurance carriers;
obtaining, from a remote, installed application component, insurance related data associated with an insurance entity on which a workflow on the remote, installed application component is operating;
determining, based at least in part on the defined new rule and data aggregated from at least some of the other remote, installed application components included in the plurality of remote, installed application components that are associated with different insurance carriers, that a new action item to be executed on the remote, installed application component should be generated;
generating, at the central hosted component, the new action item based at least in part on the determination; and
communicating, to the remote, installed application component, the generated new action item to be executed by the remote, installed application component, wherein the new action item, when executed by the remote, installed application component, modifies a workflow on the remote, installed application component without modifying application code on the remote, installed application component.

21. The computer program product recited in claim 20, further comprising storing the new rule on the central hosted component.

22. The computer program product recited in claim 20, wherein the new action item includes one or more of an insurance related activity, underwriting issue, alert, notification, hold, trouble ticket, or block.

23. The computer program product of claim 20, further comprising obtaining data from an external third-party source that is unavailable to the remote, installed application component.

* * * * *